(12) United States Patent
Ono et al.

(10) Patent No.: US 11,008,729 B2
(45) Date of Patent: May 18, 2021

(54) WORK IMPLEMENT OF MOTOR GRADER AND MOTOR GRADER

(71) Applicant: KOMATSU LTD., Tokyo (JP)

(72) Inventors: Yutaka Ono, Tokyo (JP); Akihiko Sakamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 316 days.

(21) Appl. No.: 16/088,908

(22) PCT Filed: Sep. 11, 2017

(86) PCT No.: PCT/JP2017/032652
§ 371 (c)(1),
(2) Date: Sep. 27, 2018

(87) PCT Pub. No.: WO2018/051942
PCT Pub. Date: Mar. 22, 2018

(65) Prior Publication Data
US 2020/0325651 A1 Oct. 15, 2020

(30) Foreign Application Priority Data

Sep. 13, 2016 (JP) .............................. JP2016-178637

(51) Int. Cl.
*E02F 3/76* (2006.01)
*E02F 3/815* (2006.01)

(52) U.S. Cl.
CPC ............ *E02F 3/764* (2013.01); *E02F 3/8152* (2013.01); *B60Y 2200/411* (2013.01); *E02F 3/7677* (2013.01); *E02F 3/7681* (2013.01)

(58) Field of Classification Search
CPC ......... E02F 3/764; E02F 3/815; E02F 3/8152; E02F 3/8157
(Continued)

(56) References Cited

U.S. PATENT DOCUMENTS 2,799,099 A * 7/1957 Leliter .................... E02F 3/764
172/667
2,825,985 A * 3/1958 Weeks .................. E02F 3/8157
172/260.5
(Continued)

FOREIGN PATENT DOCUMENTS

| CN | H03-021418 U | 3/1991 |
| CN | 105714868 A | 6/2016 |

(Continued)

OTHER PUBLICATIONS

JP Office Action dated Aug. 25, 2020 from corresponding Japanese patent application No. 2018-539701 (with attached English-language translation).

*Primary Examiner* — Thomas B Will
*Assistant Examiner* — Joel F. Mitchell
(74) *Attorney, Agent, or Firm* — Faegre Drinker Biddle & Reath LLP (57) ABSTRACT

A work implement of a motor grader in which a blade can readily be replaced includes a shift cylinder assembly and a blade. The shift cylinder assembly includes a blade shift cylinder and a rail which carries out reciprocating motion with extending and retracting of the blade shift cylinder. The blade is removably attached to the shift cylinder assembly. The blade includes a hook and the shift cylinder assembly includes a hook reception portion. The hook is hooked on the hook reception portion.

6 Claims, 6 Drawing Sheets

(58) Field of Classification Search
USPC .......................................................... 172/781
See application file for complete search history.

(56) References Cited

U.S. PATENT DOCUMENTS

| | | | | |
|---|---|---|---|---|
| 4,084,643 | A * | 4/1978 | Easterling | E02F 3/7645 |
| | | | | 172/743 |
| 4,320,589 | A * | 3/1982 | Pelazza | E01H 5/063 |
| | | | | 172/12 |
| 6,585,059 | B2 * | 7/2003 | Michael et al. | E02F 3/7636 |
| | | | | 172/811 |
| 7,650,949 | B1 | 1/2010 | Horstman | |
| 8,316,956 | B2 * | 11/2012 | Horstman et al. | E02F 3/3604 |
| | | | | 172/781 |
| 2002/0000324 | A1 | 1/2002 | McGugan | |
| 2004/0034979 | A1 | 2/2004 | Englot | |
| 2008/0138154 | A1 | 6/2008 | Horstman et al. | |
| 2016/0176691 | A1 | 6/2016 | Tan et al. | |
| 2019/0177949 | A1 * | 6/2019 | Harshnnan et al. | E02F 3/815 |

FOREIGN PATENT DOCUMENTS

| | | |
|---|---|---|
| JP | S52-161902 U | 12/1977 |
| JP | S58-10957 U | 1/1983 |
| JP | 2001-279706 A | 10/2001 |
| JP | 2001-342643 A | 12/2001 |
| JP | 2011-220004 A | 11/2011 |

* cited by examiner

WORK IMPLEMENT OF MOTOR GRADER AND MOTOR GRADER

TECHNICAL FIELD

The present invention relates to a work implement of a motor grader and a motor grader.

BACKGROUND ART

US Patent Publication No. 2008/0138154 (PTL 1) discloses a construction of a motor grader in which a guide rail attached to a blade is held by a retainer assembly.

CITATION LIST

Patent Literature

PTL 1: US Patent Publication No. 2008/0138154

SUMMARY OF INVENTION

Technical Problem

In a motor grader, a tip end portion of a blade is worn as the motor grader travels with the tip end portion of the blade being in contact with a road surface. When wear of the tip end portion of the blade reaches a limit value, the blade should be replaced. A currently used blade may be replaced with a selected optimal blade depending on contents of work done with a work implement or a condition of a road surface.

In the motor grader described in US Patent Publication No. 2008/0138154 (PTL 1), in detaching a blade from the retainer assembly, the blade should be moved in a longitudinal direction of the blade together with the guide rail and operations have been complicated.

A primary object of the present invention is to provide a work implement of a motor grader in which a blade can readily be replaced.

Solution To Problem

A work implement of a motor grader according to the present invention includes a shift cylinder assembly and a blade removably attached to the shift cylinder assembly. The shift cylinder assembly includes an extensible and retractable blade shift cylinder, a rail which carries out reciprocating motion with extending and retracting of the blade shift cylinder, and a support member which supports the rail as being slidably movable. Any one of the blade and the shift cylinder assembly includes a hook. Any the other of the blade and the shift cylinder assembly includes a hook reception portion on which the hook is hooked.

A motor grader according to the present invention includes a vehicular body frame, a swing circle revolvable with respect to the vehicular body frame, a shift cylinder assembly attached to the swing circle as being swingable with respect to the swing circle, and a blade removably attached to the shift cylinder assembly. The shift cylinder assembly includes an extensible and retractable blade shift cylinder, a rail which carries out reciprocating motion with extending and retracting of the blade shift cylinder, and a support member which supports the rail as being slidably movable. Any one of the blade and the shift cylinder assembly includes a hook. Any the other of the blade and the shift cylinder assembly includes a hook reception portion on which the hook is hooked.

Advantageous Effects of Invention

According to the work implement of the motor grader in the present invention, a blade can readily be replaced.

DESCRIPTION OF EMBODIMENTS

A work vehicle according to an embodiment of the present invention will be described below with reference to the drawings. The same elements have the same reference characters allotted in the description below and their labels and functions are also the same. Therefore, detailed description thereof will not be repeated.

Figure 1:
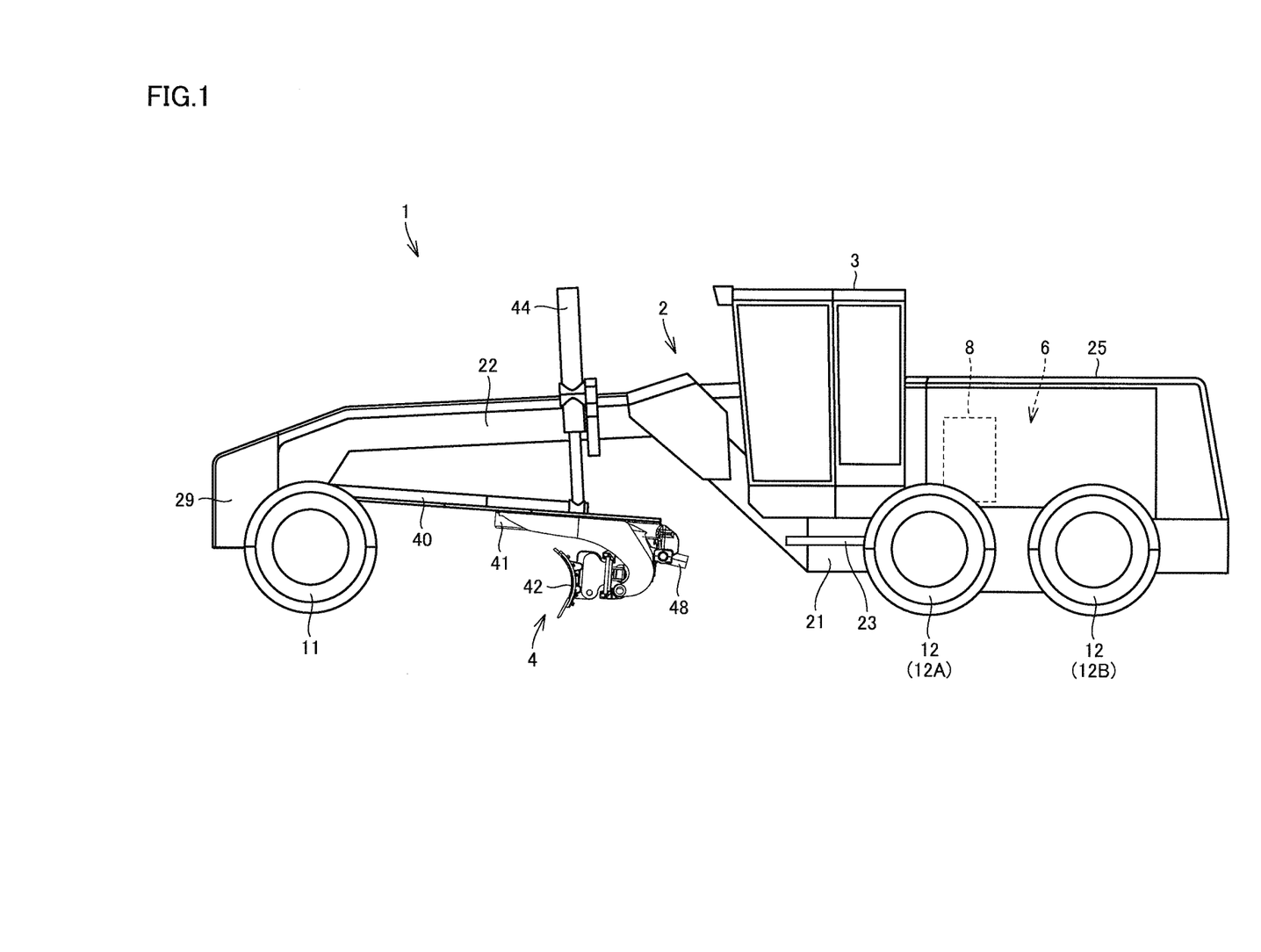
FIG. 1 is a side view schematically showing a construction of a motor grader based on an embodiment.

FIG. 1 is a side view schematically showing a construction of a motor grader 1 based on an embodiment. A schematic construction of motor grader 1 to which the concept of the present invention is applicable will initially be described.

As shown in FIG. 1, motor grader 1 mainly includes running wheels 11 and 12, a vehicular body frame 2, a cab 3, and a work implement 4. Motor grader 1 includes components such as an engine 8 arranged in an engine compartment 6. Work implement 4 includes a blade 42. Motor grader 1 can do such works as land-grading works, snow removal works, light cutting, and mixing of materials with blade 42.

Running wheels 11 and 12 include a front wheel 11 and a rear wheel 12. Rear wheel 12 includes a front rear wheel 12A and a rear rear wheel 12B. Though FIG. 1 shows running wheels six in total which consist of two front wheels 11 one on each side and four rear wheels 12 two on each side, the number of front wheels and rear heels and arrangement thereof are not limited to the example shown in FIG. 1.

In the description of the drawings below, a direction in which motor grader 1 travels in straight lines is referred to as a fore/aft direction of motor grader 1. In the fore/aft direction of motor grader 1, a side where front wheel 11 is arranged with respect to work implement 4 is defined as the fore direction. In the fore/aft direction of motor grader 1, a side where rear wheel 12 is arranged with respect to work implement 4 is defined as the aft direction. A lateral direction of motor grader 1 is a direction orthogonal to the fore/aft direction in a plan view. A right side and a left side in the lateral direction in facing front are defined as a right direction and a left direction, respectively. An upward/downward direction of motor grader 1 is a direction orthogonal to the plane defined by the fore/aft direction and the lateral direction. A side in the upward/downward direction where the ground is located is defined as a lower side and a side where the sky is located is defined as an upper side.

The fore/aft direction refers to a fore/aft direction of an operator who sits at an operator's seat in cab 3. The lateral direction refers to a lateral direction of the operator who sits at the operator's seat. The lateral direction refers to a direction of a vehicle width of motor grader 1. The upward/downward direction refers to an upward/downward direction of the operator who sits at the operator's seat. A direction in which the operator sitting at the operator's seat faces is defined as the fore direction and a direction behind the operator sitting at the operator's seat is defined as the aft direction. A right side and a left side at the time when the operator sitting at the operator's seat faces front are defined as the right direction and the left direction, respectively. A foot side of the operator who sits at the operator's seat is defined as a lower side, and a head side is defined as an upper side.

Vehicular body frame 2 extends in the fore/aft direction (the lateral direction in FIG. 1). Vehicular body frame 2 includes a rear frame 21 and a front frame 22.

Rear frame 21 supports an exterior cover 25 and components such as engine 8 arranged in an engine compartment 6. Engine 8 is mounted on rear frame 21. Engine 8 is arranged in the rear of cab 3. Exterior cover 25 covers engine 8. Exterior cover 25 defines engine compartment 6 which accommodates engine 8. For example, each of four rear wheels 12 is supported by rear frame 21 as being rotatably driven by driving force from engine 8.

Front frame 22 is attached in front of rear frame 21. Front frame 22 is pivotably coupled to rear frame 21. Front frame 22 extends in the fore/aft direction. Front frame 22 includes a base end portion coupled to rear frame 21 and a tip end portion opposite to the base end portion. The base end portion of front frame 22 is coupled to the tip end portion of rear frame 21 with a vertical central pin being interposed.

An articulation cylinder 23 is attached between front frame 22 and rear frame 21. Front frame 22 is provided as being pivotable with respect to rear frame 21 owing to extending and retracting of articulation cylinder 23. Articulation cylinder 23 is provided as being extensible and retractable in response to an operation of a control lever provided in cab 3.

For example, two front wheels 11 are rotatably attached to the tip end portion of front frame 22. Front wheel 11 is attached to front frame 22 as being revolvable owing to extending and retracting of a not-shown steering cylinder. Motor grader 1 can change its direction of travel owing to extending and retracting of the steering cylinder. The steering cylinder can extend and retract in response to an operation of a steering wheel or a steering control lever provided in cab 3.

A counter weight 29 is attached to a front end of vehicular body frame 2. Counter weight 29 represents one type of attachments to be attached to front frame 22. Counter weight 29 is attached to front frame 22 in order to increase a downward load to be applied to front wheel 11 to allow steering and to increase a pressing load on blade 42.

Cab 3 is carried on rear frame 21. In cab 3, an operation portion (not shown) such as a steering wheel, a gear shift lever, a lever for controlling work implement 4, a brake, an accelerator pedal, and an inching pedal is provided. Cab 3 includes a front surface portion, left and right side surface portions, and a rear surface portion. A space surrounded by the front surface portion, the side surface portions, and the rear surface portion defines an indoor space in cab 3. Cab 3 may be carried on front frame 22.

Work implement 4 mainly includes a draw bar 40, a swing circle 41, and blade 42.

Draw bar 40 has a front end portion swingably attached to a tip end portion of front frame 22. Draw bar 40 has a rear end portion supported on front frame 22 by a pair of lift cylinders 44. Owing to extending and retracting of lift cylinders 44, the rear end portion of draw bar 40 can move up and down with respect to front frame 22. Draw bar 40 is vertically swingable with an axis along a direction of travel of the vehicle being defined as the center, as a result of extending and retracting of lift cylinders 44. As a result of extending and retracting of a draw bar shift cylinder, draw bar 40 is movable laterally with respect to front frame 22.

Swing circle 41 is revolvably (rotatably) attached to the rear end portion of draw bar 40. Swing circle 41 can be driven by a hydraulic motor as being revolvable clockwise and counterclockwise with respect to draw bar 40 when viewed from above the vehicle. Swing circle 41 is configured to be revolvable with respect to front frame 22. As swing circle 41 is driven to revolve, an angle of inclination of blade 42 with respect to the fore/aft direction of motor grader 1 is adjusted.

Blade 42 is arranged between front wheel 11 and rear wheel 12. Blade 42 is supported on swing circle 41. Blade 42 is supported on front frame 22 with swing circle 41 and draw bar 40 being interposed.

Blade 42 is supported as being movable in the lateral direction with respect to swing circle 41. Specifically, a blade shift cylinder 47 not shown in FIG. 1 is attached to swing circle 41 and blade 42 and arranged along a longitudinal direction of blade 42. With blade shift cylinder 47 extending and retracting, blade 42 is movable in the lateral direction with respect to swing circle 41. Blade 42 is movable in a direction intersecting with a longitudinal direction of front frame 22.

Blade 42 is supported as being swingable around an axis extending in the longitudinal direction of blade 42 with respect to swing circle 41. Specifically, a tilt cylinder 48 is attached to swing circle 41 and blade 42. As a result of extending and retracting of tilt cylinder 48, blade 42 swings around the axis extending in the longitudinal direction of blade 42 with respect to swing circle 41, so that an angle of inclination of blade 42 with respect to the direction of travel of the vehicle can be changed.

As set forth above, blade 42 is configured to be able to move up and down with respect to the vehicle, swing around the axis along the direction of travel of the vehicle, change an angle of inclination with respect to the fore/aft direction, move in the lateral direction, and swing around the axis extending in the longitudinal direction of blade 42, with draw bar 40 and swing circle 41 being interposed.

Figure 2:
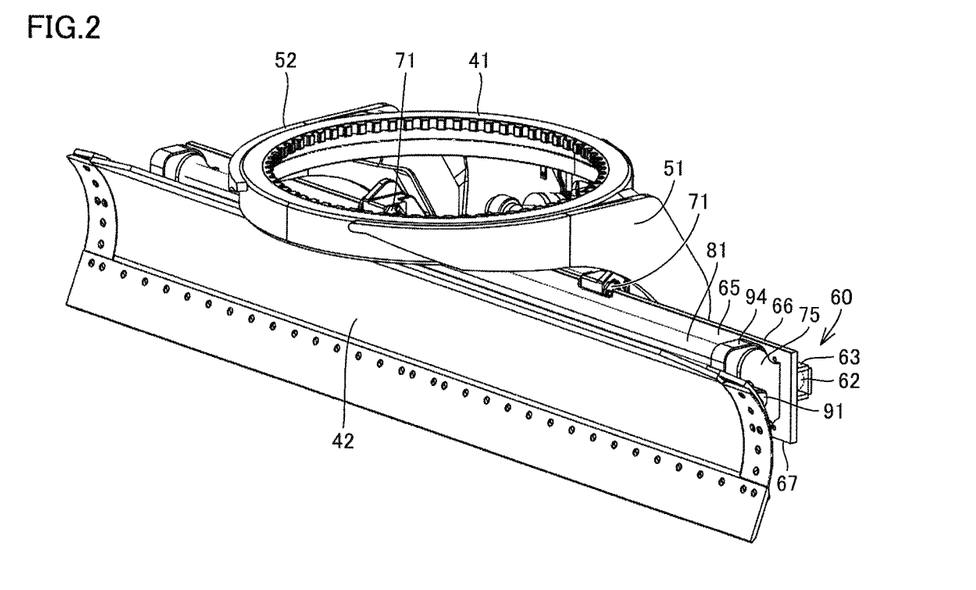
FIG. 2 is a perspective view of a shift cylinder assembly and a blade.
Figure 3:
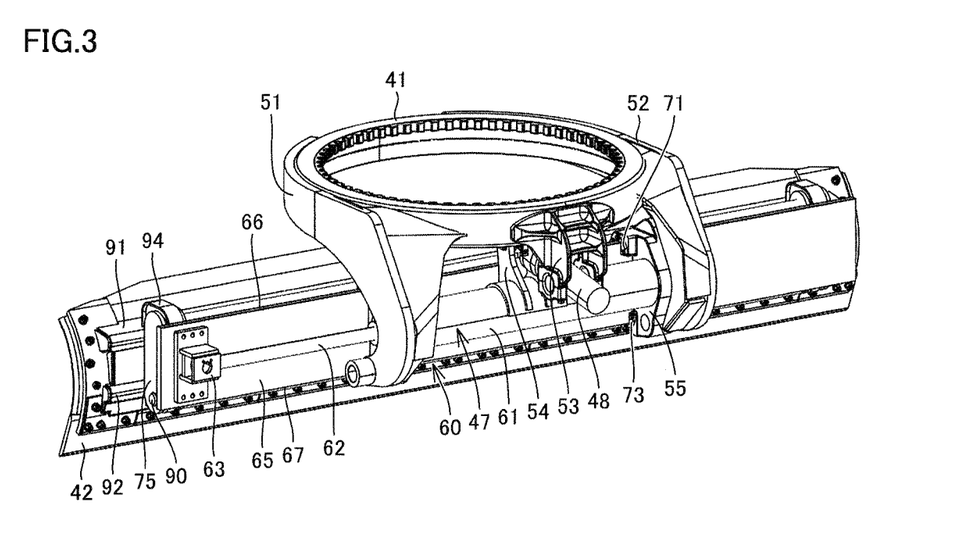
FIG. 3 is a perspective view of the shift cylinder assembly and the blade from a different angle.
Figure 4:
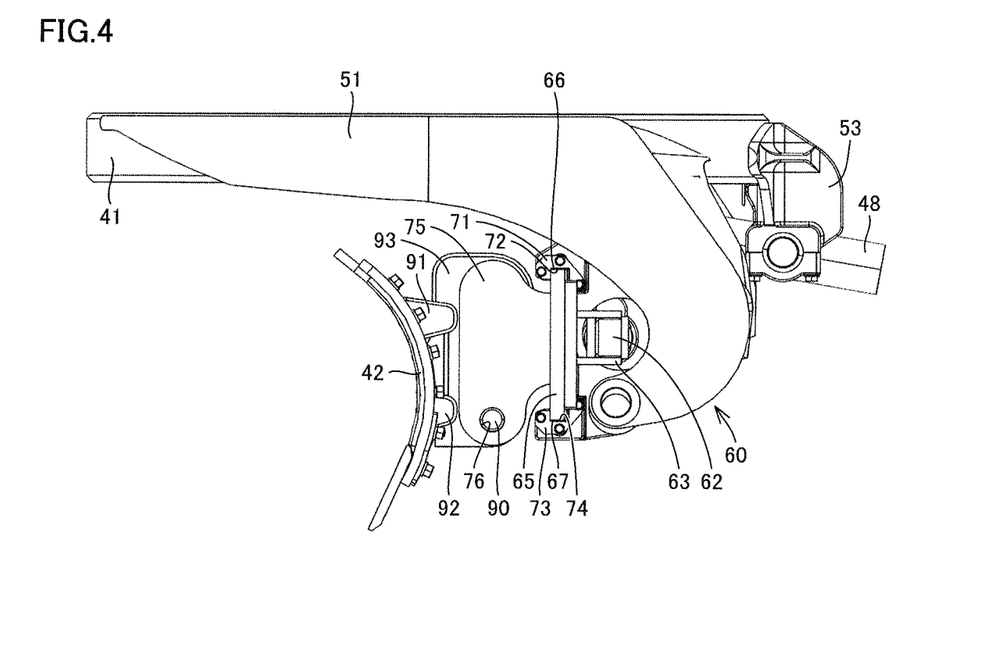
FIG. 4 is a side view of the shift cylinder assembly and the blade.

FIG. 2 is a perspective view of shift cylinder assembly 60 and blade 42. FIG. 3 is a perspective view of shift cylinder assembly 60 and blade 42 from a different angle. FIG. 4 is a side view of shift cylinder assembly 60 and blade 42. As shown in FIGS. 2 to 4, shift cylinder assembly 60 is arranged on a rear surface side of blade 42. Shift cylinder assembly 60 mainly includes blade shift cylinder 47, a rail 65, and retainers 71 and 73.

Blade shift cylinder 47 is a hydraulic cylinder. Blade shift cylinder 47 includes a cylinder portion 61 and a piston portion 62. Cylinder portion 61 is in a hollow cylindrical shape. Cylinder portion 61 is arranged such that an axial direction thereof extends along the longitudinal direction of blade 42. Piston portion 62 is supported in cylinder portion 61 so as to be able to carry out reciprocating motion in the axial direction of cylinder portion 61. Piston portion 62 is configured such that a length of its projection from an end portion of cylinder portion 61 to the outside of cylinder portion 61 is variable. Blade shift cylinder 47 is configured such that the entire length thereof is variable with reciprocating motion of piston portion 62.

A tip end portion of piston portion 62 is supported by a cylinder mount 63. Cylinder mount 63 is fixed to rail 65. Rail 65 is configured to be able to carry out reciprocating motion in the longitudinal direction of blade 42 with extending and retracting of blade shift cylinder 47. Rail 65 is formed from one elongated rectangular flat plate. A long side of rail 65 extends in the longitudinal direction of blade 42. A short side of rail 65 extends in the vertical direction while an angle of inclination of blade 42 with respect to the direction of travel of the vehicle is neutral. Rail 65 includes an upper edge 66 and a lower edge 67. Upper edge 66 and lower edge 67 define a pair of long sides of elongated rectangular rail 65 in a form of a flat plate.

Upper edge 66 of rail 65 is supported by retainer 71. A recess 72 which is recessed as opening downward is provided in retainer 71. Upper edge 66 of rail 65 is accommodated in recess 72. Lower edge 67 of rail 65 is supported by retainer 73. A recess 74 recessed as opening upward is provided in retainer 73. Lower edge 67 of rail 65 is accommodated in recess 74. Retainers 71 and 73 implement support members which support rail 65 as being slidably movable in the longitudinal direction of blade 42.

Support arms 51 and 52 are fixed to swing circle 41. Support arms 51 and 52 are configured as being revolvable integrally with swing circle 41. Shift cylinder assembly 60 is attached to swing circle 41 with support arms 51 and 52 being interposed. The pair of retainers 71 and 73 is provided at a distance from each other in the lateral direction. One of the pair of retainers 71 and 73 arranged on the right is supported by support arm 52 with a bracket 55 being interposed. The other of the pair of retainers 71 and 73 arranged on the left is supported on support arm 51 with a similar bracket being interposed.

A cylinder support member 53 is fixed to swing circle 41. Cylinder support member 53 is configured to be revolvable integrally with swing circle 41. Cylinder support member 53 supports tilt cylinder 48. Tilt cylinder 48 includes a cylinder portion and a piston portion, and the cylinder portion of tilt cylinder 48 is fixed to cylinder support member 53. A pair of projecting pieces 54 which projects upward is fixed to an outer circumferential surface of cylinder portion 61 of blade shift cylinder 47. The tip end portion of the piston portion of tilt cylinder 48 is fixed to an upper end of projecting piece 54. With tilt cylinder 48 extending and retracting, shift cylinder assembly 60 swings around the axis extending in the longitudinal direction of blade 42.

Rail 65 includes a rear surface to which cylinder mount 63 is fixed and a front surface opposite to the rear surface. The front surface of rail 65 is opposed to blade 42. An outer plate portion 75 which extends forward as being orthogonal to rail 65 is fixed to the front surface of rail 65. A through hole 76 which passes through outer plate portion 75 in a direction of thickness is provided in outer plate portion 75. An insertion member 90 is inserted in through hole 76. Through hole 76 has an inner diameter greater than a diameter of insertion member 90.

A main body portion of blade 42 is in a curved shape which is smoothly curved when viewed laterally. The main body portion of blade 42 includes a front surface which is an inner surface of curving and a rear surface which is an outer surface of curving. The rear surface of blade 42 is opposed to the front surface of rail 65.

Blade 42 includes support brackets 91 and 92 and a plate member 93. Support brackets 91 and 92 and plate member 93 are arranged on a rear surface side of the main body portion of blade 42. Support brackets 91 and 92 are fixed to the rear surface of the main body portion of blade 42. Support brackets 91 and 92 are arranged in parallel at a distance from each other in the vertical direction. Support brackets 91 and 92 extend in the longitudinal direction of blade 42.

Plate member 93 is fixed to support brackets 91 and 92. Plate member 93 is fixed to the rear surface of the main body portion of blade 42 with support brackets 91 and 92 being interposed. Plate member 93 includes a hook 94 at its upper end portion.

Figure 5:
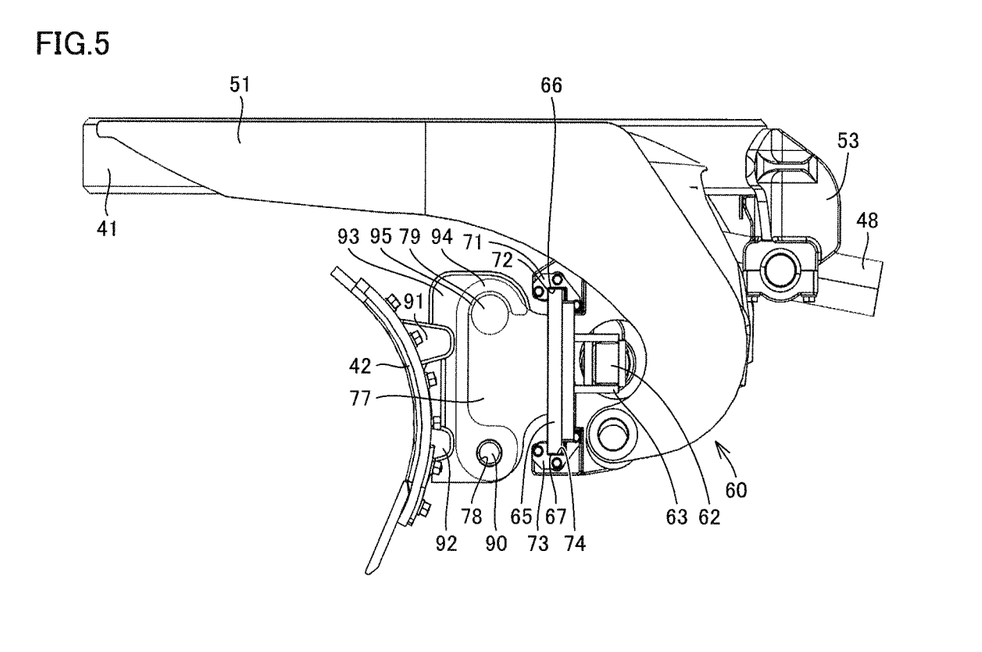
FIG. 5 is a side view of the shift cylinder assembly from which an outer plate portion has been detached and the blade.

FIG. 5 is a side view of shift cylinder assembly 60 from which outer plate portion 75 has been detached and blade 42. An inner plate portion 77 which extends forward as being orthogonal to rail 65 is fixed to the front surface of rail 65. Inner plate portion 77 is arranged at a distance from outer plate portion 75 and in parallel to outer plate portion 75. A through hole 78 which passes through inner plate portion 77 in a direction of thickness is provided in inner plate portion 77. Insertion member 90 is inserted in through hole 78. Through hole 78 has an inner diameter greater than the diameter of insertion member 90. Through hole 76 in outer plate portion 75 is equal in inner diameter to through hole 78 in inner plate portion 77.

A hook reception portion 79 is arranged between outer plate portion 75 and inner plate portion 77. Hook reception portion 79 has a cylindrical outer geometry. Hook reception portion 79 has one end coupled to a surface of outer plate portion 75 which is opposed to inner plate portion 77. Hook reception portion 79 has the other end engaged with inner plate portion 77. Hook 94 is hooked on hook reception portion 79. A liner portion 95 is provided on an inner peripheral surface of hook 94. Liner portion 95 is in a shape of an arc face and is in contact with an outer circumferential surface of hook reception portion 79 in a shape of a cylindrical pin. Liner portion 95 is formed of a material higher in wear resistance than plate member 93.

As shown in FIGS. 2 and 3, outer plate portion 75 and inner plate portion 77 are provided at each of left and right end portions of rail 65. A pair of hook reception portions 79 is provided at the left and right end portions of rail 65, respectively. The pair of inner plate portions 77 is coupled to each other with a rod-shaped coupling member 81 (FIG. 2) which extends laterally. Hook reception portions 79 are arranged at respective opposing ends of coupling member 81. Hook reception portions 79 and coupling member 81 may integrally be formed.

Hook 94 is hooked on each of the pair of hook reception portions 79 and insertion member 90 is inserted into a through hole 96 provided in plate member 93 which will be described later, so that blade 42 is attached to shift cylinder assembly 60. Blade 42 and rail 65 are thus integrally movable. Shift cylinder assembly 60 includes an engagement portion for engagement of blade 42, and the engagement portion includes hook reception portion 79 and insertion member 90. Insertion member 90 implements a locking member which attaches blade 42 to shift cylinder assembly 60.

Vertical positional relation between hook reception portion 79 and insertion member 90 is such that hook reception portion 79 is located above insertion member 90 and insertion member 90 is located below hook reception portion 79. In shift cylinder assembly 60, hook reception portion 79 is located above and insertion member 90 is located below.

Figure 6:
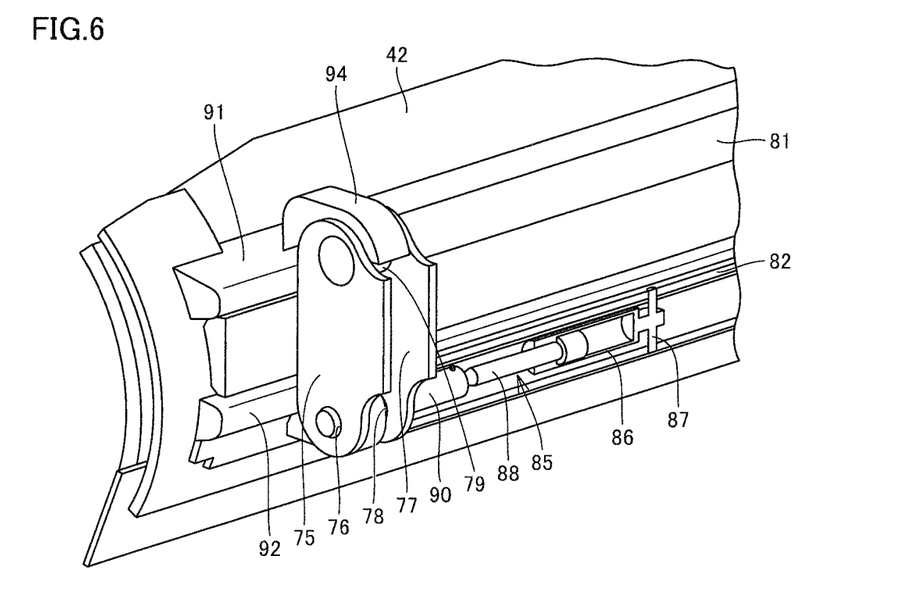
FIG. 6 is a perspective view showing a structure of attachment of the blade to the shift cylinder assembly as being enlarged.

An operation to detach blade 42 from shift cylinder assembly 60 will now be described. FIG. 6 is a perspective view showing a structure of attachment of blade 42 to shift cylinder assembly 60 as being enlarged. FIG. 6 shows blade 42 viewed from the rear surface side and each feature of shift cylinder assembly 60 arranged in front of rail 65.

As shown in FIG. 6, an accommodation member 82 extending in parallel to coupling member 81 is arranged on the rear surface side of blade 42. Accommodation member 82 is in a hollow cylindrical shape. FIG. 6 and FIGS. 7 to 9 which will be described later show accommodation member 82 in a cross-section and also show a feature accommodated in an internal space in accommodation member 82.

An actuator 85 is accommodated in the internal space in accommodation member 82. Actuator 85 is a hydraulic cylinder. Actuator 85 includes a cylinder 86 and a piston 88. Cylinder 86 is in a hollow cylindrical shape. An axial direction of cylinder 86 extends along the longitudinal direction of accommodation member 82. Piston 88 is supported in cylinder 86 as being movable in the axial direction of cylinder 86. Piston 88 is configured such that a length of its projection from an end portion of cylinder 86 to the outside of cylinder 86 is variable.

Cylinder 86 includes a pair of engagement pins 87. Engagement pin 87 projects radially outward from cylinder 86. Engagement pin 87 is inserted in an engagement hole provided in an inner wall surface of accommodation member 82. Cylinder 86 is thus positioned in the longitudinal direction of accommodation member 82.

Insertion member 90 in a shape of a cylindrical pin is attached to a tip end portion of piston 88. Insertion member 90 is accommodated in accommodation member 82 and configured such that a length of its projection from the end portion of accommodation member 82 to the outside of accommodation member 82 is variable. Accommodation member 82 has the end portion coupled to inner plate portion 77 at a position in inner plate portion 77 where through hole 78 is provided. The internal space in accommodation member 82 communicates with through hole 78.

Insertion member 90 carries out reciprocating motion integrally with piston 88, along with reciprocating motion of piston 88. Piston 88 shown in FIG. 6 projects maximally to the outside of cylinder 86, and hence insertion member 90 is arranged as being projecting maximally to the outside of accommodation member 82. Insertion member 90 shown in FIG. 6 is arranged at a position where the insertion member is in through hole 96 in plate member 93 which will be described later. Insertion member 90 shown in FIG. 6 passes through through hole 78 in inner plate portion 77, passes through through hole 96 in plate member 93, and passes through through hole 76 in outer plate portion 75.

Insertion member 90 is inserted in both of through holes 76 and 78 provided in shift cylinder assembly 60 and through hole 96 provided in blade 42 so that blade 42 is attached to shift cylinder assembly 60 as being movable integrally with rail 65. Blade 42 is locked by insertion member 90 as being relatively immovable with respect to shift cylinder assembly 60.

Figure 7:
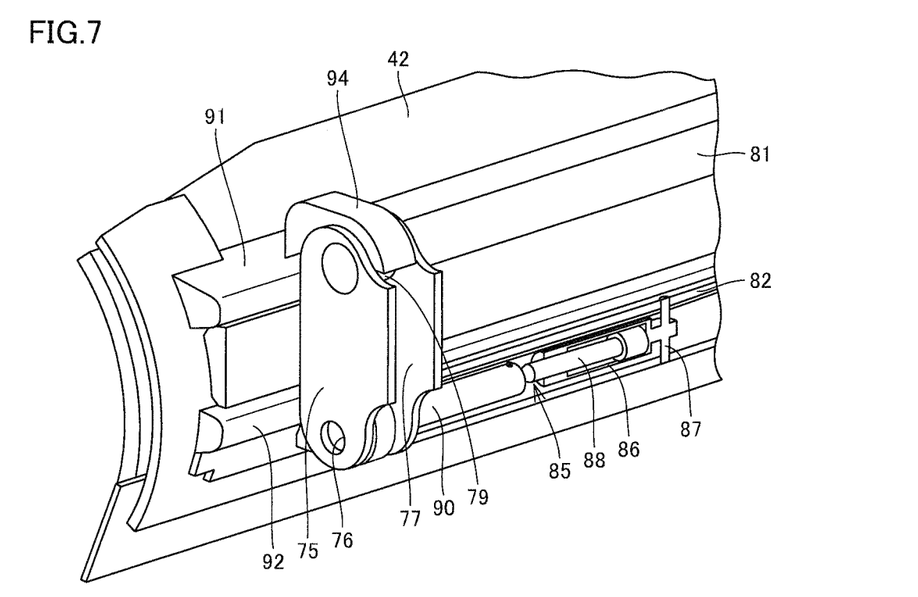
FIG. 7 is a perspective view showing a state of movement of an insertion member.

FIG. 7 is a perspective view showing a state of movement of insertion member 90. Piston 88 shown in FIG. 7 has moved from the arrangement shown in FIG. 6 to the inside of cylinder 86. Insertion member 90 attached to the tip end portion of piston 88 has moved to the inside of accommodation member 82 with movement of cylinder 86. Insertion member 90 shown in FIG. 7 is arranged at a position where the insertion member is out of through hole 96 in plate member 93. As insertion member 90 moves out of through hole 96 provided in blade 42, blade 42 is unlocked and blade 42 is relatively movable with respect to shift cylinder assembly 60.

Figure 8:
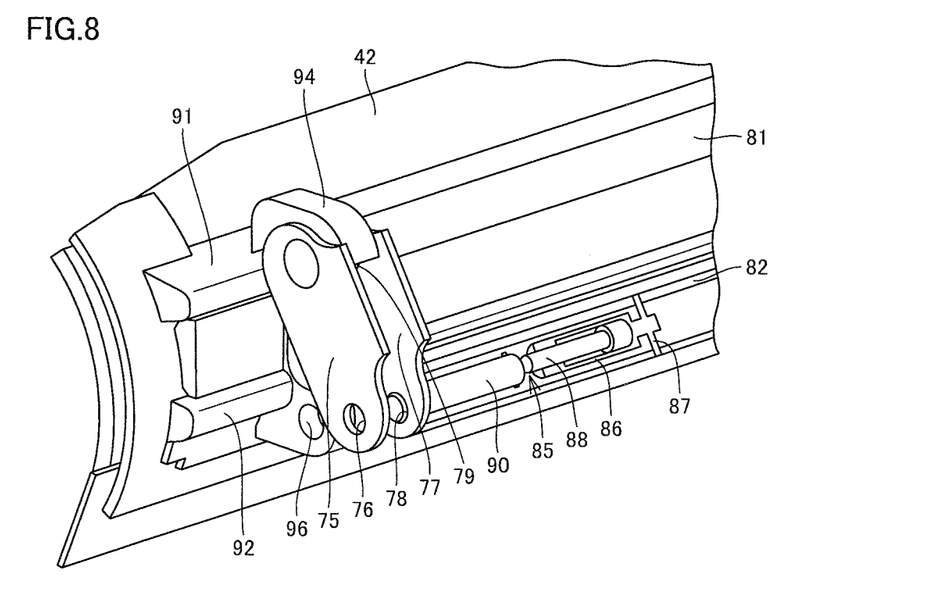
FIG. 8 is a perspective view showing a state of swing of the shift cylinder assembly.

FIG. 8 is a perspective view showing a state of swing of shift cylinder assembly 60. By extending tilt cylinder 48 shown in FIGS. 3 to 5 from the arrangement shown in FIG. 7, shift cylinder assembly 60 swings around the axis extending in the longitudinal direction of blade 42. Referring also to FIG. 5, as tilt cylinder 48 extends, shift cylinder assembly 60 swings such that upper edge 66 of rail 65 in a form of a flat plate moves forward relative to lower edge 67 and rail 65 is inclined with respect to the vertical direction.

Since insertion member 90 has moved out of through hole 96, blade 42 is relatively movable with respect to shift cylinder assembly 60. Even when shift cylinder assembly 60 swings, blade 42 does not move together with shift cylinder assembly 60 and blade 42 is arranged as in FIG. 7. When shift cylinder assembly 60 moves from the arrangement shown in FIG. 7 to the arrangement shown in FIG. 8, liner portion 95 provided on the inner peripheral surface of hook 94 slides against the outer circumferential surface of hook reception portion 79.

In the arrangement shown in FIG. 8, a portion on a lower end side of plate member 93 where through hole 96 is provided is located as being displaced from the space defined between outer plate portion 75 and inner plate portion 77. In plate member 93, only hook 94 is arranged between outer plate portion 75 and inner plate portion 77. In FIG. 8, blade 42 and shift cylinder assembly 60 are engaged with each other only by hook 94 hooked on hook reception portion 79.

Figure 9:
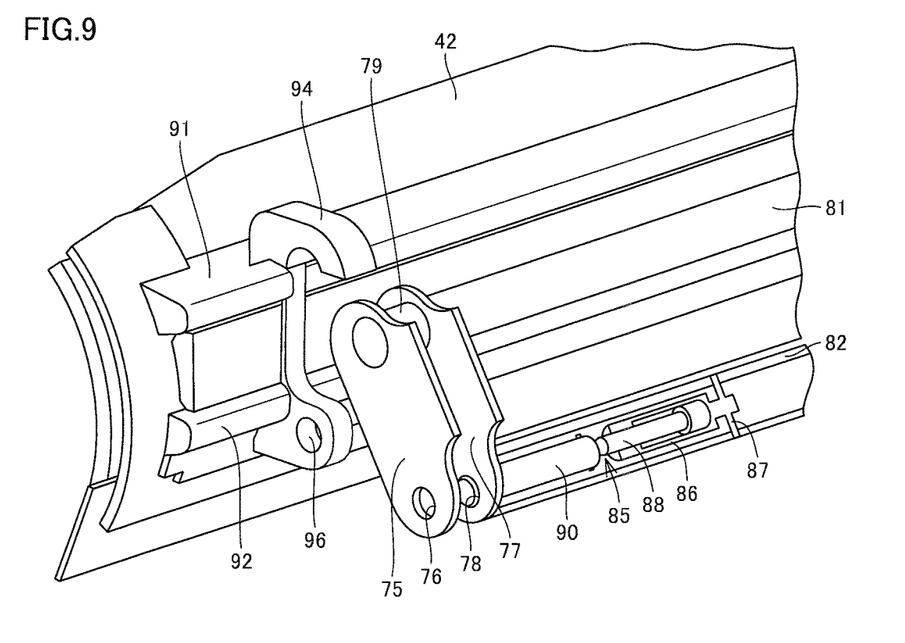
FIG. 9 is a perspective view showing a state that a hook has been detached from a hook reception portion.
Figure 10:
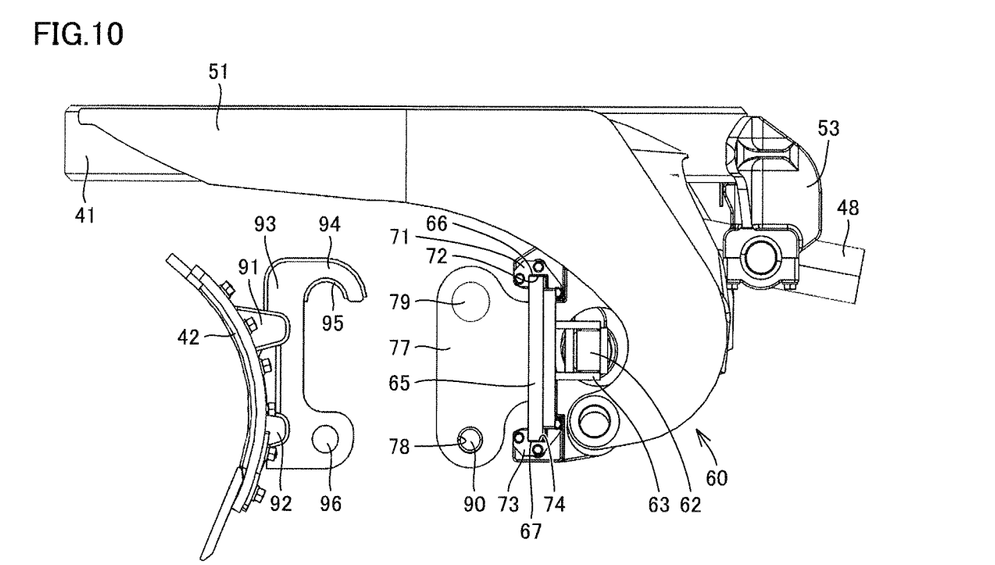
FIG. 10 is a side view of a state that the blade has been detached from the shift cylinder assembly.
Figure 11:
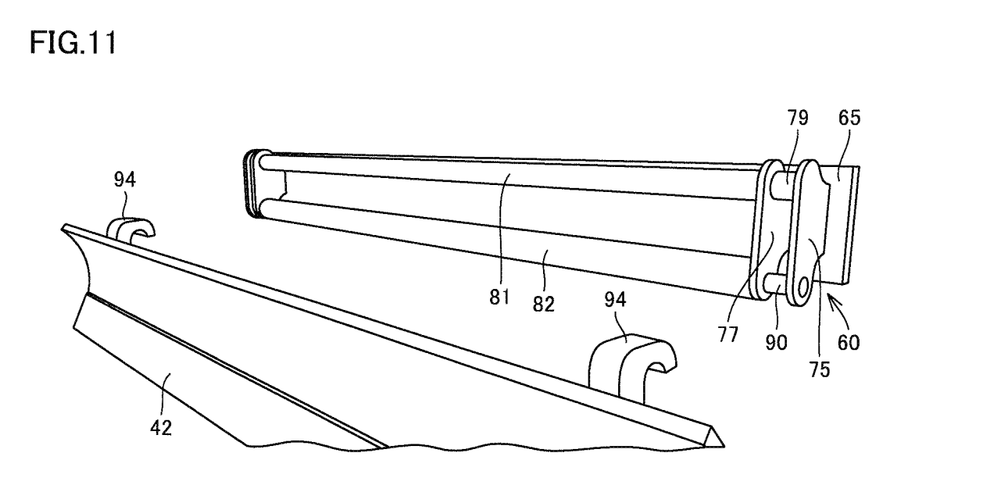
FIG. 11 is a perspective view of the state that the blade has been detached from the shift cylinder assembly.

FIG. 9 is a perspective view showing a state that hook 94 has been detached from hook reception portion 79. FIG. 10 is a side view of a state that blade 42 has been detached from shift cylinder assembly 60. FIG. 11 is a perspective view of the state that blade 42 has been detached from shift cylinder assembly 60.

By detaching hook 94 from hook reception portion 79 from the arrangement shown in FIG. 8, blade 42 and shift cylinder assembly 60 are completely disengaged from each other as shown in FIG. 9. By moving blade 42 in a direction away from shift cylinder assembly 60 along the direction of thickness, blade 42 is detached from shift cylinder assembly 60 and such arrangement that blade 42 is distant from shift cylinder assembly 60 shown in FIGS. 10 and 11 is obtained.

As shown in FIG. 10, plate member 93 includes hook 94 in its upper end portion. Hook 94 is in such a shape as protruding in a direction away from blade 42 with respect to the rear surface of blade 42. The lower end portion of plate member 93 is also in a shape protruding in a direction away from blade 42. Through hole 96 which passes through plate member 93 in the direction of thickness is provided in the lower end portion of plate member 93. The lower end portion of plate member 93 where through hole 96 is provided has a thickness smaller than a distance between outer plate portion 75 and inner plate portion 77.

Through hole 96 is in an annular shape. Through hole 96 has an inner diameter greater than a diameter of insertion member 90. Through hole 96 has an inner diameter equal to or greater than the inner diameter of through hole 76 provided in outer plate portion 75. Through hole 96 has an inner diameter equal to or greater than the inner diameter of through hole 78 provided in inner plate portion 77.

By performing operations to detach blade 42 from shift cylinder assembly 60 described with reference to FIGS. 6 to 11 in a reverse order, blade 42 can be attached to shift cylinder assembly 60. By moving blade 42 in a direction toward shift cylinder assembly 60 along the direction of thickness, hooking hook 94 on hook reception portion 79, and inserting insertion member 90 into through hole 96, blade 42 can be attached to shift cylinder assembly 60 so that blade 42 and rail 65 are integrally movable.

A construction and a function and effect of work implement 4 of motor grader 1 in the embodiment described above are summarized as below. The features in the embodiment have reference characters allotted by way of example.

As shown in FIG. 3, work implement 4 of motor grader 1 in the embodiment includes shift cylinder assembly 60 and blade 42. Shift cylinder assembly 60 includes blade shift cylinder 47 and rail 65 which carries out reciprocating motion as a result of extending and retracting of blade shift cylinder 47. As shown in FIGS. 5 and 10, blade 42 is removably attached to shift cylinder assembly 60. As shown in FIG. 10, blade 42 includes hook 94 and shift cylinder assembly 60 includes hook reception portion 79. As shown in FIG. 5, hook 94 is hooked on hook reception portion 79.

By performing an operation to hook hook 94 on hook reception portion 79, blade 42 can be attached to shift cylinder assembly 60. By performing an operation to detach hook 94 from hook reception portion 79, blade 42 can be detached from shift cylinder assembly 60. It is not necessary to move elongated blade 42 in the longitudinal direction or to fasten blade 42 to shift cylinder assembly 60 with a bolt in order to attach blade 42 to shift cylinder assembly 60. Since blade 42 can be attached to and separated from shift cylinder assembly 60 with a simplified operation, blade 42 can readily be replaced.

Unlike a conventional blade, blade 42 in the embodiment does not include a guide rail extending in the longitudinal direction of blade 42. Therefore, blade 42 is reduced in weight. Since blade 42 light in weight is readily transported, operability in an operation to replace blade 42 can be improved and blade 42 can readily be replaced.

As shown in FIG. 10, blade 42 includes plate member 93. Through hole 96 is provided in plate member 93. Shift cylinder assembly 60 includes insertion member 90. As shown in FIG. 6, insertion member 90 is provided as being insertable into through hole 96. As insertion member 90 is inserted in through hole 96, blade 42 is attached to shift cylinder assembly 60 as being movable integrally with rail 65.

By inserting insertion member 90 in through hole 96 with hook 94 being hooked on hook reception portion 79, blade 42 can be fixed to shift cylinder assembly 60. It is not necessary to fasten a bolt for fixing blade 42 to shift cylinder assembly 60, and blade 42 can be fixed to shift cylinder assembly 60 with a simplified operation.

As shown in FIGS. 6 and 7, shift cylinder assembly 60 includes actuator 85. Actuator 85 has insertion member 90 carry out reciprocating motion between a position where the insertion member is in through hole 96 and a position where the insertion member is out of through hole 96.

By activating actuator 85, insertion member 90 can be inserted in through hole 96 and blade 42 can be fixed to shift cylinder assembly 60, or insertion member 90 can be moved out of through hole 96 and blade 42 and shift cylinder assembly 60 can be unfixed from each other. An operator who operates motor grader 1 is allowed to activate actuator 85 by remote control so that blade 42 can readily be fixed to shift cylinder assembly 60.

As shown in FIGS. 7 to 9, blade 42 is configured to move in a direction away from shift cylinder assembly 60 along the direction of thickness of blade 42 to be detached from shift cylinder assembly 60. Blade 42 is configured to move in a direction toward shift cylinder assembly 60 along the direction of thickness of blade 42 to be attached to shift cylinder assembly 60.

It is thus unnecessary to move elongated blade 42 in the longitudinal direction for attaching and detaching blade 42 to and from shift cylinder assembly 60. Since blade 42 can be attached to and separated from shift cylinder assembly 60 with a simplified operation, blade 42 can readily be replaced.

Though motor grader 1 includes cab 3 in the embodiment described so far, motor grader 1 does not necessarily have to include cab 3. Motor grader 1 is not limited to such specifications that an operator is on board motor grader 1 to operate motor grader 1, but the specifications may be such that the motor grader is operated under external remote control. Since motor grader 1 does not require cab 3 for an operator to get on board in this case, motor grader 1 does not have to include cab 3.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 motor grader; 2 vehicular body frame; 3 cab; 4 work implement; 11 front wheel; 12 rear wheel; 22 front frame; 40 draw bar; 41 swing circle; 42 blade; 44 lift cylinder; 47 blade shift cylinder; 48 tilt cylinder; 51, 52 support arm; 53 cylinder support member; 54 projecting piece; 60 shift cylinder assembly; 61 cylinder portion; 62 piston portion; 63 cylinder mount; 65 rail; 66 upper edge; 67 lower edge; 71, 73 retainer; 72, 74 recess; 75 outer plate portion; 76, 78, 96 through hole; 77 inner plate portion; 79 hook reception portion; 81 coupling member; 82 accommodation member; 85 actuator; 86 cylinder; 87 engagement pin; 88 piston; 90 insertion member; 91, 92 support bracket; 93 plate member; 94 hook; and 95 liner portion

The invention claimed is:

1. A work implement of a motor grader comprising:
a shift cylinder assembly including an extensible and retractable blade shift cylinder, a rail which carries out reciprocating motion with extending and retracting of the blade shift cylinder, and a pair of support members which supports an upper edge and a lower edge of the rail as being slidably movable; and
a blade removably attached to the shift cylinder assembly, one of the blade and the shift cylinder assembly including a hook, and
the other of the blade and the shift cylinder assembly including a hook reception portion on which the hook is hooked.

2. The work implement according to claim 1, wherein
the blade includes a plate member in which a through hole is provided, and
the shift cylinder assembly includes a locking member provided as being insertable into the through hole for attachment of the blade to the shift cylinder assembly.

3. The work implement according to claim 2, wherein
the locking member includes an insertion member which is inserted in the through hole to attach the blade to the shift cylinder assembly such that the blade is movable integrally with the rail.

4. The work implement according to claim 3, wherein
the shift cylinder assembly includes an actuator which has the insertion member carry out reciprocating motion between a position where the insertion member is in the through hole and a position where the insertion member is out of the through hole.

5. The work implement according to claim 1, wherein
the blade is configured to move in a direction away from the shift cylinder assembly along a direction of thickness of the blade to be detached from the shift cylinder assembly, and
the blade is configured to move in a direction toward the shift cylinder assembly along the direction of thickness to be attached to the shift cylinder assembly.

6. A motor grader comprising:
a vehicular body frame;
a swing circle revolvable with respect to the vehicular body frame;
a shift cylinder assembly including an extensible and retractable blade shift cylinder, a rail which carries out reciprocating motion with extending and retracting of the blade shift cylinder, and a pair of support members which supports an upper edge and a lower edge of the rail as being slidably movable and attached to the swing circle as being swingable with respect to the swing circle; and
a blade removably attached to the shift cylinder assembly,
one of the blade and the shift cylinder assembly including a hook, and
the other of the blade and the shift cylinder assembly including a hook reception portion on which the hook is hooked.

* * * * *